United States Patent [19]
Bahout et al.

[11] Patent Number: 5,812,802
[45] Date of Patent: Sep. 22, 1998

[54] BUS SYSTEM WITH A REDUCED NUMBER OF LINES

[75] Inventors: Yvon Bahout, Fuveau; François Tailliet, Epinary sur Seine, both of France

[73] Assignee: SGS-Thomson Microelectronics, S.A., Lorient, France

[21] Appl. No.: 786,348

[22] Filed: Jan. 23, 1997

Related U.S. Application Data

[63] Continuation of Ser. No. 259,967, Jun. 14, 1994.

[30] Foreign Application Priority Data

Jun. 21, 1993 [FR] France .................................. 93 07728

[51] Int. Cl.⁶ ........................................................ G06F 13/00
[52] U.S. Cl. ............................................. 395/308; 395/309
[58] Field of Search ......................................... 395/308, 309

[56] References Cited

U.S. PATENT DOCUMENTS 4,901,217  2/1990  Wilson et al. .

FOREIGN PATENT DOCUMENTS

WO 92/11678  9/1929  Japan .

OTHER PUBLICATIONS

Elektor Electronics, vol. 18 No. 197, Feb. 1992, Canterbury, Great Britain, pp. 36–40, J. Ruffell "I2C Interaface for PCs"*p. 36, left col., p. 37, left col.**Figures 1,4*.
Patent Abstracts of Japan, vol. 6, No. 38 (P–105)(916) Mar. 9, 1982 & JP–A–56 157 516 (Tokoyo Shibaura Denki K.K.) Dec. 4, 1981.

Primary Examiner—Jack B. Harvey
Assistant Examiner—David A. Wiley
Attorney, Agent, or Firm—Allen, Dyer, Doppelt, Milbrath & Gilchrist, P.A.

[57] ABSTRACT

In order to reduce the number of lines of a standard bus while, at the same time, preserving the compatibility of the communications protocol, the system uses a modified bus. The modification consists in eliminating two power supply lines and in creating a line assigned to a functional signal that is complementary to one of the functional signals of the system. The supply potentials are regenerated from the functional signal and the complementary signal. The disclosed system can be applied notably to systems using I2C buses such as systems using chip-card readers.

23 Claims, 4 Drawing Sheets

BUS SYSTEM WITH A REDUCED NUMBER OF LINES

This is a continuation of Pending Ser. No. 08/259,967, filed Jun. 14, 1994, now pending.

CROSS-REFERENCE TO RELATED APPLICATION

This application claims priority from French App'n 93-07728, filed Jun. 21, 1993, which is hereby incorporated by reference.

BACKGROUND AND SUMMARY OF THE INVENTION

The invention relates to electronic systems formed by a plurality of units communicating with one another by means of bus-type links.

A standard type of bus is usually constituted by several specialized lines. Some of these lines are used to convey signals, called functional signals, such as control, address and data signals as well as clock signals in the case of synchronous systems. Other lines of the bus are assigned to the electrical power supply of the circuits that form the units of the system, and these lines are connected to a generator of power supply voltages. Thus, a bus will comprise at least two power supply lines, one of which generally defines a ground of the system, the other power supply lines being taken to potentials defined according to the needs of the technology used.

Thus, for example, the buses that conform to the I2C standard are constituted by four lines:

an "SDA" line for the two-way serial transmission of control, address and data signals, an "SCL" line to transmit a clock signal, a "Vss" line assigned to the ground and a "Vcc" line designed to receive a positive supply potential.

This I2C standard bus is used, for example, to set up systems for application in large-scale consumer electronics or in the field of automobile electronics. Such systems are typically formed by a microprocessor-based central subsystem that uses the bus to control peripheral units. A possible example of a peripheral unit would be an EEPROM type electrically erasable programmable memory that would enable data to be saved when there are no permanent power supply voltages. These memories are used particularly in automobile electronics to implement decentralized functions that call for non-volatile storage of data elements. This is the case, for example, with anti-locking systems for wheels, or with the control of "air bag" type safety systems or with various electrical tuning and adjusting systems (for car radios, seat adjustment etc.).

Other examples of the use of I2C buses include systems using microprocessor-based chip-card (smart card) readers.

Of course, the choice of a bus standard for a system dictates the type of interface for the units that form the system. This also has the consequence of dictating the type of connector that can be used. This connector should have a number of terminals that is at least equal to the number of lines of the bus. Similarly, the integrated circuits that are specially designed to be compatible with the chosen standard must also be provided with the same number of terminals. Now, a substantial portion of the manufacturing cost of system arises out of the cost of the connectors used, and this cost is directly related to the number of their terminals. It is therefore preferable that this number should be as small as possible. Thus, by providing for only one series link to convey the commands, the addresses and the data elements at the same time, the I2C standard enables the number of lines of the bus to be limited to four.

Another advantage of having a small number of bus lines lies in the improved reliability of the system due to the fact that reducing the number of terminals of the connectors gives rise to a proportional reduction in the risks of malfunctioning in the corresponding electrical contacts. Similarly, reducing the number of lines leads to a reduction in the cost of the wiring which may be high in the case of automobile applications for example.

Another case in which it is worthwhile to reduce the number of lines is when it is sought to release a terminal of a connector to enable access to an additional terminal of the integrated circuit, designed to be inserted into this connector. This additional terminal will be designed, for example, to connect a test line that can be used during the finalizing stage or when the system is being installed.

The invention is therefore aimed at seeking solutions that can be used to reduce the number of lines of the communication buses to the maximum extent while at the same time maintaining compatibility with an imposed standard, especially in keeping the communications protocol laid down by this standard.

To this end, an object of the invention is a system comprising a transmitter of functional signals such as data, address, control or clock signals, a power supply circuit, a plurality of units matched with a protocol and a communications bus of a first type, the bus of the first type comprising notably two power supply lines designed to convey power supply potentials delivered by the power supply circuit and at least one functional line designed to convey one of the functional signals delivered by the transmitter of functional signals, wherein the system includes at least one communications bus of a second type, defined by a modification of the bus of the first type, according to which the power supply lines are eliminated and there is added a complementary functional line supplied with a functional signal that is complementary to the functional signal and wherein at least one of the units of the system is connected to a communications bus of the second type by means of an adaptation circuit comprising a power supply regenerator to produce regenerated power supply potentials from the functional signal and the complementary functional signal.

Since, as a general rule, the high and low levels of the functional signals correspond to power supply potentials, the invention can be applied to most of the existing standard buses, without there being any need to modify the levels of the functional signal normally available at one of the lines of the bus. Thus, according to another characteristic of the invention, the system includes a conversion circuit with an inverter amplifier supplied with the power supply potentials, receiving the functional signal at input and giving the complementary functional signal at output.

According to a particular embodiment, the power supply regenerator has a full-wave rectifier circuit receiving the functional signal and the complementary functional signal at input and giving the regenerated power supply potentials at output.

Should it be necessary to have an amplification of the functional signal in terms of current or voltage, then provision could be made, according to one alternative embodiment of the invention, for the conversion circuit to comprise a non-inverter amplifier supplied with the power supply potentials, receiving the functional signal at input and giving an amplified functional signal at output, this amplified functional signal replacing the initial functional signal at the input of the rectifier circuit.

According to yet another variant of an embodiment of the invention, the power supply regenerator is provided with means to adjust the levels of the potentials that it gives. This arrangement could prove to be useful or necessary if there should be too great a difference between the levels of the power supply potentials of the amplifiers used to give the complementary functional signal and/or the amplified functional signal and the levels of the power supply potentials and/or of the functional signal that can be used by the unit.

The invention can be applied in a particularly advantageous way in a system according to the I2C standards, especially when MOS or CMOS technology is used. Since the bus of the second type used according to the invention has only three lines, it will be possible to use the connectors initially designed for the discrete three-terminal components such as transistors. It is therefore possible to use conventional packaging tools that have been developed long ago for components of this type. This will lead to a saving in manufacturing costs due to the low price of the connectors and to reduced outlay on tools.

According to other aspects of the invention, at least one unit and the associated adaptation circuit form part of one and the same integrated circuit, and this unit may be an electrically erasable programmable memory of the EEPROM type.

The invention also relates to the application of the system defined here above to make systems that use microprocessor-based card readers.

According to a disclosed class of innovative embodiments, there is provided a system comprising: a transmitter of functional signals such as data, address, control or clock signals; a power supply circuit; a plurality of units matched with a protocol; and a communications bus of a first type, comprising two power supply lines designed to convey power supply potentials delivered by the power supply circuit and at least one functional line designed to convey one of the functional signals delivered by the transmitter of functional signals, wherein the system also includes at least one communications bus of a second type, defined by a modification of the bus of the first type, according to which the power supply lines are eliminated and there is added a complementary functional line supplied with a functional signal that is complementary to the functional signal, and wherein at least one of the units of the system is connected to a communications bus of the second type by means of an adaptation circuit comprising a power supply regenerator to produce regenerated power supply potentials from the functional signal and the complementary functional signal.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
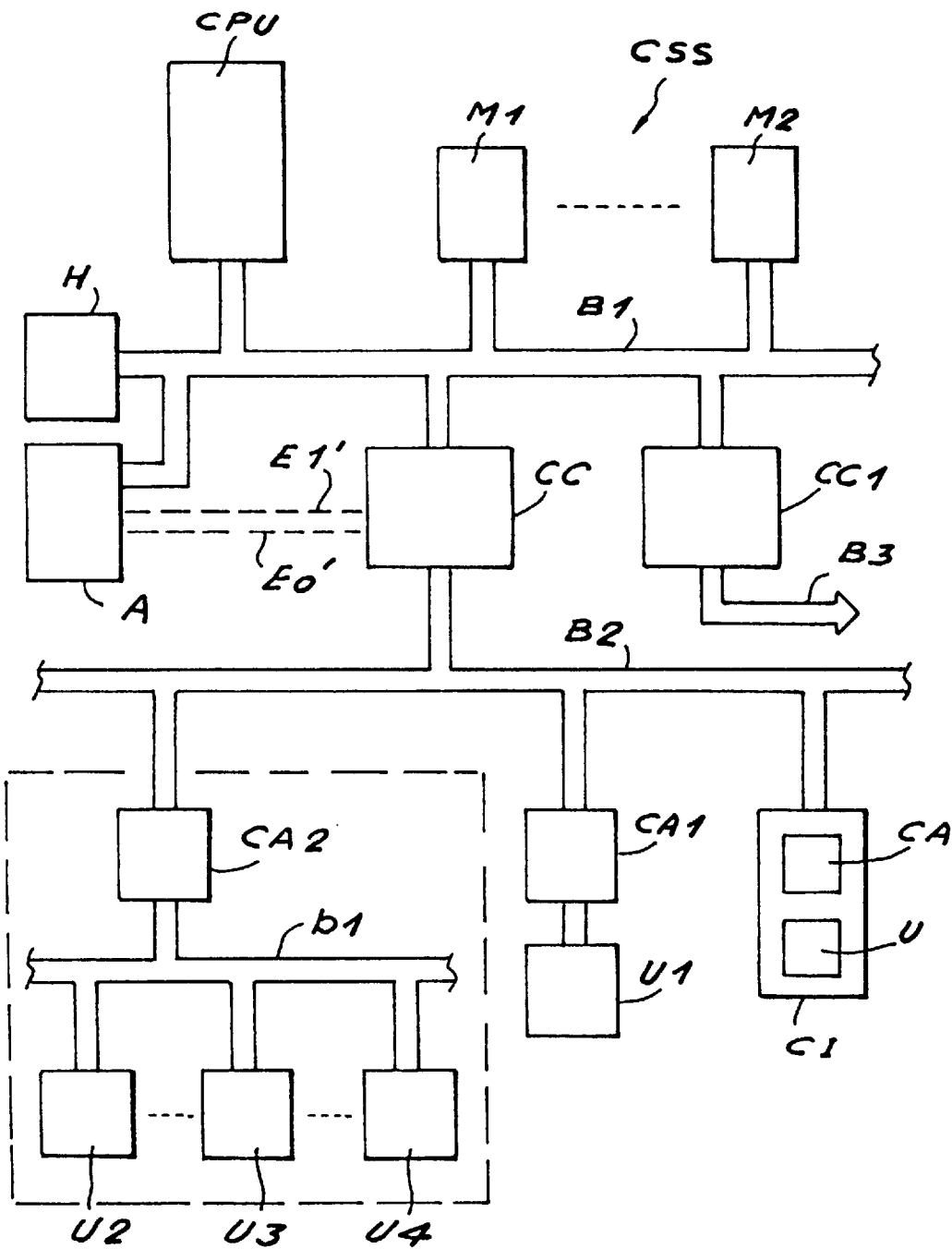
FIG. 1 shows a general view of a system according to the invention.

The numerous innovative teachings of the present application will be described with particular reference to the presently preferred embodiment (by way of example, and not of limitation), in which FIG. 1 exemplifies a system according to the invention. The system is considered to be controlled by a central sub-system CSS organized around a first communications bus B1 to which there are connected a microprocessor CPU and units M1, M2 such as random-access memories, read-only memories, input-output controllers or telecommunications interfaces. According to the example shown, the system is of the synchronous type, a generator H of clock signals being connected to certain specialized lines of the bus B1. Finally, a power supply circuit A connected to other specialized lines of the bus B1 gives the necessary power supply potentials to the various circuits of the system. The processor CPU and the units M1, M2 communicate with one another by means of the bus B1 according to a predetermined communications protocol. The bus B1 conforms, for example, to the standard I2C which defines both the allocation of the lines of the bus and the communications protocol.

According to the invention, the system has a second communications bus B2 of a second type with a number of lines that is smaller than the number of lines of the bus B1. The buses B1 and B2 are connected to each other by means of a conversion circuit CC. The system could also include other buses B3 of the second type, each connected to the bus B1 by means of associated conversion circuits CC1.

The system also has a plurality of units U, U1, U2, U3, U4 whose interfaces are considered to conform to the standard defined by the bus B1. These units U, U1–U4 are connected to the second bus B2 by means of adaptation circuits CA, CA1, CA2. In the example shown, certain units U2, U3, U4 are connected to a common adaptation circuit CA2 by means of a third bus b1 that conforms to the standard of the bus B1. All these units may be made in the form of integrated circuits. Advantageously, it is possible to use integrated circuits CI that are specially designed to incorporate the unit U as well as the associated adaptation circuit CA.

As shall be seen in greater detail here below, the conversion and adaptation circuits are designed so that the bus B2 has a number of lines smaller than that of the bus B1 while at the same time enabling the use of the units U, U1–U4 that conform to the communications protocol of the bus B1. This reduction of the number of lines therefore entails a reduction of wiring and connections costs when specific integrated circuits are used.

Figure 2:
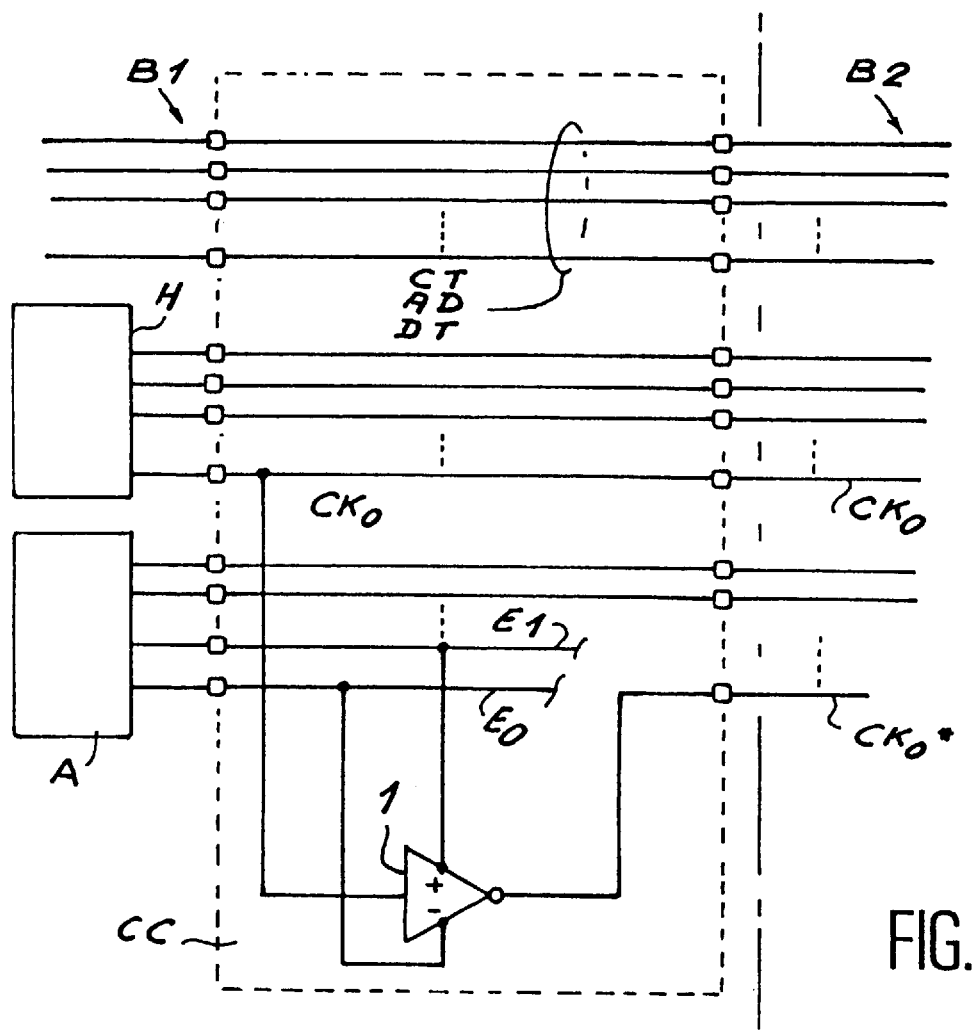
FIG. 2 shows an exemplary embodiment of the conversion circuit according to the invention.

FIG. 2 shows a view in greater detail of an exemplary embodiment of a conversion circuit CC. The bus B1 shown in a schematic view at the left of the figure has a number of functional lines used, for example, to transmit control signals CT, address signals AD and data signals DT as well as clock signals such as CK0. In the case of a I2C bus, the lines CT, AD and DT are reduced to only one line called SDA.

A generator H of clock signals gives the clock signals used for the synchronization of the system such as, for example, the signal CK0. In the case of the I2C bus, only one clock signal SCL is provided for.

The bus B1 finally has power supply lines connected to a power supply circuit A giving the power supply potentials such as E0 and E1 needed for the circuits of the system. In the case of an I2C bus, there are provided only two lines Vss and Vcc allocated respectively to the ground and to a potential of five volts.

As a non-restrictive example, the functional signal chosen to replace the power supply potentials is one of the clock signals CK0. Naturally, it is also possible to choose another functional signal provided, of course, that it is a one-way signal going from the bus B1 to the bus B2. According to the invention, the conversion circuit CC enables the bus B1 to be converted into a bus B2 having a number of lines smaller than at least one unit. Thus, according to the example shown, the power supply lines assigned to the potentials E0 and E1 are eliminated, one of them being replaced by a line assigned to the signal CK0* given by an inverter amplifier 1 of the conversion circuit CC. The inverter amplifier 1 is supplied with the potentials E0 and E1 and receives the clock signal CK0 at input. The signal CK0* therefore constitutes a signal that is complementary (the word "complementary" being understood in terms of logic functions) to the clock signal CK0. In the usual case where the signal CK0 has low levels and a high level that are respectively equal to the two potentials E0 and E1, the complementary clock signal CK0* will therefore possess the same high and low levels. As shall be explained with reference to FIG. 4, the power supply potentials E0 and E1, which are absent from the bus B2, could be easily regenerated from the signals CK0 and CK0*.

Figure 3:
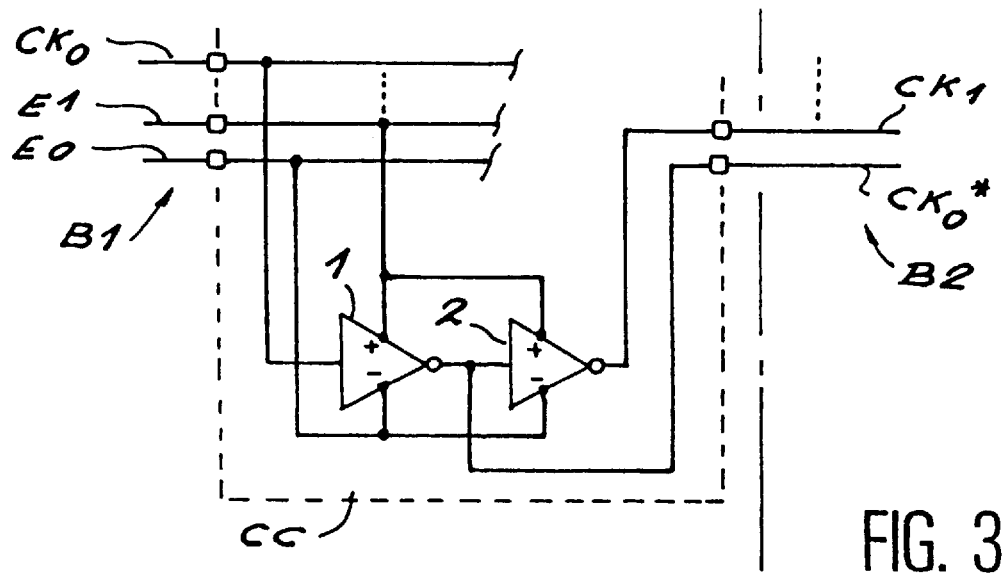
FIG. 3 shows an alternative embodiment of the circuit of FIG. 2.

Should it not be possible to make direct use of the signal CK0 to regenerate the power supply potentials, an alternative embodiment as shown in FIG. 3 could be adopted. According to this variant, the signal CK0 is replaced by a signal CK1 given by a non-inverter amplifier of the signal CK0. For this purpose, it is enough to make provision, in the conversion circuit CC, for a second inverter amplifier 2 that is cascade-connected with the first inverter amplifier 1, this second inverter amplifier 2 being also supplied with the potentials E0 and E1. The output signal of the inverter amplifier 2 is therefore an amplified clock signal CK1 in phase with the clock signal CK0, and its low and high levels will therefore be dictated by the power supply potentials E0 and E1. This arrangement will therefore make it possible to reduce the load of the generator H, which may prove to be useful if the generator is not given dimensions so that it lets through substantial current as could be the case for certain technologies or if it is planned to connect a large number of units to the bus B2. This arrangement also enables the levels of the signals CK0* and CK1 to be made independent of the levels of the signal CK0. It will also be possible to replace the potentials E0 and E1 of the bus by specific potentials 2E0' and E1' coming from the power supply circuit A as shown schematically in FIG. 1. By providing, for example for potentials E0' and E1' that are respectively lower than E0 and E1, it is possible to compensate for the voltage drops prompted by the power supply regenerator 3.

Figure 4:
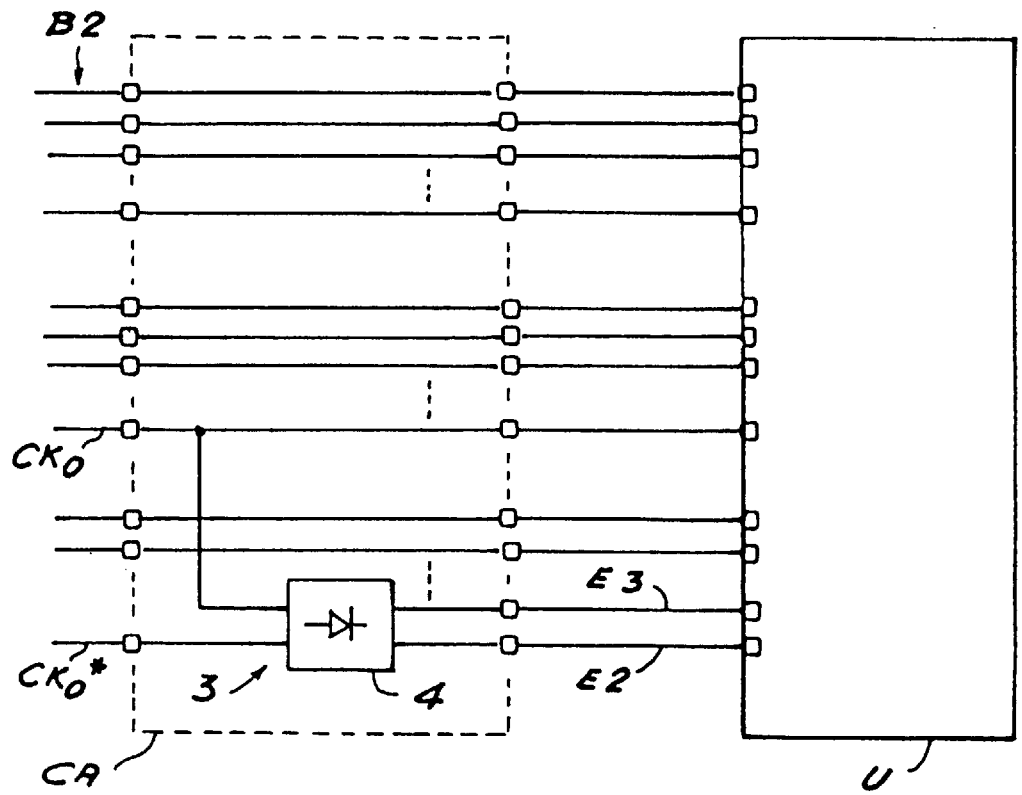
FIG. 4 shows an exemplary embodiment of an adaptation circuit according to the invention.

FIG. 4 shows an adaptation circuit CA matched with the conversion circuit CC according to FIG. 2. The adaptation circuit CA is to a large extent constituted by simple interconnections to place the lines of the bus B2 in a state of communication with the corresponding inputs of the associated unit U. In particular, the clock signal CK0 is directly transmitted to the corresponding clock input of the unit U. The circuit CA has a power supply regenerator 3 which, in the example described, is limited to a simple rectifier circuit 4 receiving the clock signal CK0 and the complementary clock signal CK0* as inputs, the outputs of the rectifier 4 giving the regenerated power supply potentials E2 and E3 which are then applied to the corresponding power supply inputs of the unit U.

Figure 5:
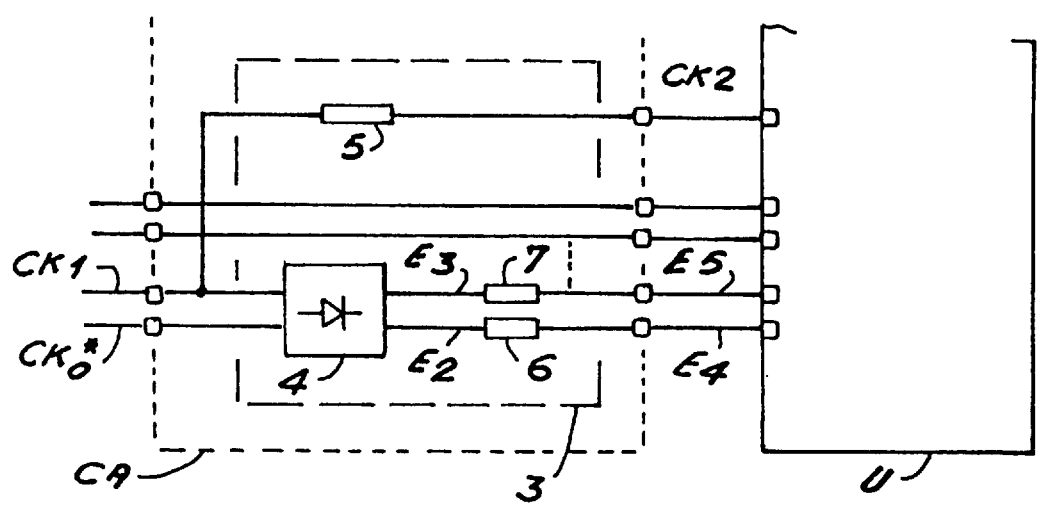
FIG. 5 shows an alternative embodiment of the circuit of FIG. 4.

One alternative embodiment of the circuit A is shown in FIG. 5. This alternative embodiment is adapted to the conversion circuit of FIG. 3. In this case, the power supply regenerator 3 also has a rectifier circuit 4 that receives the complementary clock signal CK0* and the amplified clock signal CK1 at input. The clock input of the unit U designed to receive the clock signal CK0 is connected to the amplified clock signal CK1, possibly by means of an element 5 for adjusting the levels. The element 5 is, for example, a resistor or a diode assembly designed to limit the amplitude of the signal CK1 if the potentials E0 and E1 should be far too different from the high and low levels that are acceptable for the clock input of the unit U.

For the same reason, it is also possible to provide for means such as resistors or diodes 6, 7 to attenuate the potentials E2, E3 given by the rectifier 4, especially when the above-mentioned auxiliary potentials E0' and E1' are used.

Figure 6:
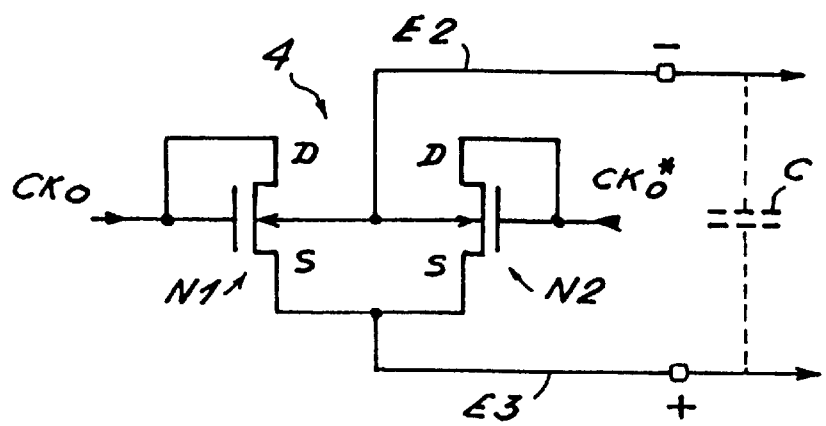
FIG. 6 shows an exemplary embodiment of a full-wave rectifier according to MOS technology.

FIG. 6 shows an exemplary embodiment, in MOS technology, of the rectifier circuit 4. It is formed by two n channel MOS transistors N1, N2, each having its drain connected to its gate. Their sources are connected together as also are their substrates. The gates of the transistors N1 and N2 respectively receive the clock signal CK0 and the clock signal CK0*. The sources of the transistors N1 and N2 constitute the positive terminal of the rectifier while their substrates constitute the negative terminal. As a variant, the signal CK0 may be replaced by the amplified signal CK1.

Figure 7A:
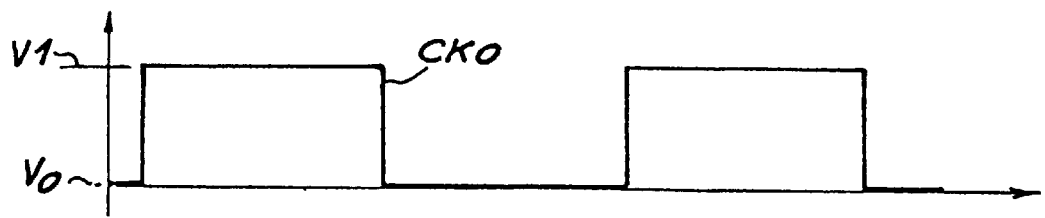
FIG. 7 shows timing diagrams that can be used to explain the working of the circuit of FIG. 6.
Figure 7B:
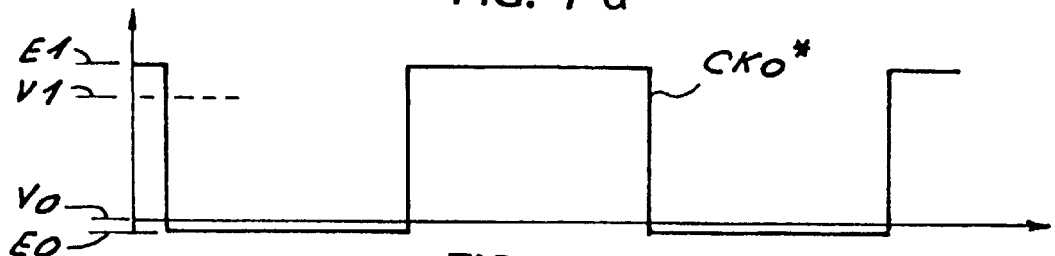
Figure 7C:
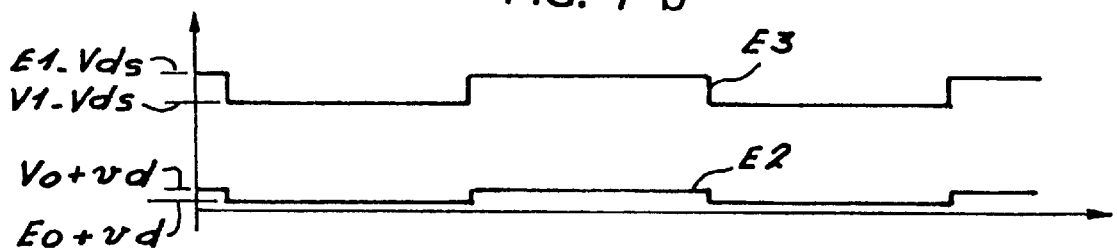

The working of the circuit of FIG. 6 may be explained with reference to the timing diagrams of FIG. 7. The timing diagram (a) represents the signal CK0 with the shape of square-wave pulses whose low and high levels are respectively V0 and V1. The timing diagram (b) represents the complementary clock signal CK0*, in the exemplary embodiment of FIG. 3. The signal CK0* then varies between the potentials E0 and E1 which are considered to be different respectively from the levels V0 and V1. Of course, it is also possible to have E0=V0 and V1=E1.

The timing diagram (c) shows the potentials E2 and E3 given by the rectifier. As can be seen in the figure, the potential E2 is equal to the lowest potentials of the signals CK0 and CK0* to which there are added the voltage drop vd of the p-n junction between the substrate and the channel of the transistors. The potential E3 is equal to the highest potential of the signals CK0 and CK0* from which is subtracted the voltage drop Vds due to the resistor of the channel of the transistors. As compared with a full-wave rectifier bridge using diodes, the assembly proposed therefore has the advantage wherein a single p-n junction prompting a voltage threshold of the order of 0.6 volts is in series with the load.

The variations of the signals E2 and E3 at each half-wave of the clock signal CK0 are essentially due to the fact that the potentials E0 and E1 are respectively different from V0 and V1. This phenomenon obviously does not exist if these potentials are respectively equal. In practice, these fluctuations are but of little importance in view of the filtering effect due to the structural capacitance C of the integrated circuits in MOS technology.

The timing diagram (C) shows why is worthwhile to use the auxiliary potentials E0' and E1' if it is sought to obtain easy compensation for the voltage drops Vds and vd.

The invention is not limited solely to the exemplary embodiments described herein. On the contrary, it may be suited to other types of buses, especially those comprising several power supply lines that can be used to further reduce the number of lines of the bus of the second type.

What is claimed is:

1. A system, comprising:
a transmitter of functional signals such as data, address, control or clock signals;
a first communications bus connected to receive ones of said functional signals;
one or more first units which are connected to said first bus and which interface thereto using a first protocol;
a second communications bus carrying ones of said functional signals, and also carrying an additional functional signal, which is not present on said first communications bus, and which is derived from said functional signals, said second communications bus being functionally connected to said first communications bus;
one or more second units which are connected to have a communications interface to said second bus but not to said first bus;
wherein at least one of said second units is connected to said second communications bus by means of an adaptation circuit comprising a power supply regenerator which is connected to receive said first functional signals and said additional functional signal, and to produce regenerated power supply potentials therefrom;
and wherein said first bus, but not said second bus, comprises two power supply lines each connected to convey a respective DC power supply potential.

2. The system of claim 1, further comprising a conversion circuit having an inverting amplifier supplied with said power supply potentials, and connected to receive said ones of said functional signals at an input and giving said additional functional signal at an output.

3. The system of claim 2, wherein said power supply regenerator has a full-wave rectifier circuit receiving said ones of said functional signals and said additional functional signal at input and giving said regenerated power supply potentials at output.

4. The system of claim 2, wherein said conversion circuit gives an amplified functional signal at output, and wherein said power supply regenerator comprises a full-wave rectifier circuit receiving said additional functional signal and said amplified functional signal at input.

5. The system of claim 1, wherein said power supply regenerator is provided with means to adjust the levels of the potentials that it gives.

6. The system of claim 1, wherein said first bus conforms to the I2C standard, one of said first functional signals being the clock signal stipulated by said standard.

7. The system of claim 1, wherein at least one of said second units and said adaptation circuit are integrated in a common integrated circuit.

8. The system of claim 7, wherein said at least one of said units contained in said integrated circuit is an electrically erasable programmable memory.

9. The system of claim 1, incorporated in a microprocessor-based card reader.

10. The system of claim 1, wherein said functional signals have substantially continuous activity.

11. The system of claim 1, wherein one of said first functional signals is a clock signal.

12. A system, comprising:
a transmitter of non-constant first functional signals such as data, address, control or clock signals;
a conversion circuit, connected to receive, on a first communications bus, one of said first functional signals, and giving, at an output, an additional functional signal which is derived from said one of said first functional signals in such a way as to be affected by transitions in said first functional signals;
a second communications bus, connected to said output of said conversion circuit, said second communications bus comprising
a first functional line connected to carry said one of said first functional signals, and
a second functional line supplied with said additional functional signal; and
multiple units connected to said second bus;
wherein said second communications bus consists of fewer lines than said first communications bus;
wherein said multiple units have no non-ground power connection other than said first and second functional lines.

13. The system of claim 12, wherein each said unit includes a full-wave rectifier circuit which is connected to receive said first and second functional lines at input, and to derive respective first and second power supply potentials therefrom, and to power said respective unit thereby.

14. The system of claim 12, wherein said conversion circuit comprises a non-inverting amplifier supplied with first and second power supply potentials, receiving said functional signals at input and giving an amplified functional signal at output, and further comprising a power supply regenerator having a full-wave rectifier circuit which is connected to receive said first and second functional lines at input, and to derive said first and second power supply potentials therefrom, and to power said units thereby.

15. The system of claim 12, wherein one of said first functional signals is a clock signal.

16. The system of claim 12, wherein said first functional signals have substantially continuous activity.

17. A method for reducing the number of lines in a bus system, comprising the steps of:
a) receiving, on an input of a first bus, a first system potential, a second system potential, and first functional signals which include at least one data signal and a first clock signal;
b) producing an additional functional signal which is dependent on said first functional signals;
c) transmitting said first functional signals and said additional functional signal, but not said first and second system potential, over a second bus;
d) locally producing, in one or more receiving units, first and second local power supply potentials from said first functional signals and said additional functional signal; and
e) powering said receiving units exclusively from said first and second local power supply potentials.

18. The method of claim 17, wherein said first system potential is a ground potential.

19. The method of claim 17, wherein said first and second local power supply potentials are respectively approximately equal to said first and second system potentials.

20. The system of claim 1, wherein said additional functional signal is complementary to said one of said functional signals.

21. The system of claim 1, wherein said second bus does not carry either of said two power supply lines.

22. The system of claim 12, wherein said additional functional signal is complementary to said one of said functional signals.

23. The system of claim 17, wherein step b) produces an additional functional signal which is complementary to said one of said functional signals.

* * * * *

UNITED STATES PATENT AND TRADEMARK OFFICE
CERTIFICATE OF CORRECTION

PATENT NO. : 5,812,802
DATED : September 22, 1998
INVENTOR(S) : Yvon Bahout, and Francois Tailliet It is certified that error appears in the above-identified patent and that said Letters Patent is hereby corrected as shown below:

Title page, [73] Assignee:    Strike:
" Lorient, France "

Insert:
-- Gentilly, France --

Signed and Sealed this

Nineteenth Day of January, 1999

Attest:

Attesting Officer

*Acting Commissioner of Patents and Trademarks*